United States Patent Office 3,686,149
Patented Aug. 22, 1972

3,686,149
PROCESS FOR PREPARATION OF AROMATIC POLYBENZIMIDAZOLES
Yoshio Ohfuji, Kurashiki, Japan, assignor to Kuraray Co., Ltd., Kurashiki, Japan
No Drawing. Filed Oct. 8, 1970, Ser. No. 79,282
Claims priority, application Japan, Oct. 10, 1969, 44/82,092; Apr. 21, 1970, 45/34,585
Int. Cl. C08g 33/02
U.S. Cl. 260—78.4 N                            13 Claims

ABSTRACT OF THE DISCLOSURE

A process for preparing aromatic polybenzimidazoles is provided which comprises heating a mixture of an aromatic tetramine, an aromatic dinitrile and an aromatic triamino-monohalo compound or an aromatic diamino-dihalo compound at a temperature sufficient to effect a polycondensation reaction.

---

The present invention relates to a process for the preparation of aromatic polybenzimidazoles exhibiting high molecular weight and excellent thermal stability.

It is well known that high molecular weight compounds containing benzimidazole rings and aromatic nuclei in their molecular chain generally exhibit high melting points and high thermal stabilities.

It is also known that aromatic polybenzimidazoles, especially those of high molecular weight, are not obtainable by merely heating a mixture of aromatic tetramines and aromatic dicarboxylic acids or derivatives thereof.

One method of preparing high molecular weight aromatic polybenzimidazoles comprises melt polymerizing an aromatic tetramine and a diphenyl ester or an anhydride of an aromatic dicarboxylic acid at an elevated temperature and thereafter further polymerizing the product of the melt polymerization in the solid state (see U.S. Pat. No. 3,174,947). However, according to this process, in order to produce polymers of sufficiently high molecular weight to be suitable for practical use, it is necessary to finely pulverize the product of the melt polymerization prior to polymerization in the solid state and to conduct the solid state polymerization at an elevated temperature under a reduced pressure of less than 0.5 mm. Hg or at an elevated temperature and in an inert gas stream over a long period of time.

Thus, the process disclosed in U.S. Pat. No. 3,174,947 requires several complicated operations. In addition, since the reaction is conducted over a long period of time at an elevated temperature, it tends to form insoluble and infusible polymers.

One method which has heretofore been proposed to overcome the above-mentioned deficiencies involves the solution polymerization of an inorganic acid salt of an aromatic tetramine and a dicarboxylic acid or a derivative thereof with heat in polyphosphoric acid (see U.S. Pat. No. 3,313,783). According to this process, the polymeric product, after completion of the reaction, can be separated by pouring the reaction mixture in the form of a polyphosphoric acid solution into a large quantity of water. However, this separation procedure is complicated and moreover, it is difficult to recover and reuse the polyphosphoric acid. Thus, this process is not generally considered satisfactory for the commercial production of polybenzimidazoles. Moreover, polybenzimidazoles obtained by this process contain phosphorus which is difficult to remove completely.

Accordingly, it is an object of this invention to provide a new and improved process for preparing aromatic polybenzimidazoles.

Another object of the present invention is to provide a process for preparing aromatic polybenzimidazoles of high molecular weight by merely heating the reactants.

These as well as other objects are accomplished by the present invention which provides a process for preparing aromatic polybenzimidazoles comprising heating a mixture of (A) an aromatic tetramine containing two groups of amine substituents, said amine substituents in each group being in an ortho position relative to each other on the aromatic nucleus, (B) an aromatic dinitrile and (C) a tetrasubstituted aromatic compound containing two groups of ortho disposed substituents, wherein one of the four substituents or one substituent in each group is halogen and the remaining substituents are amino groups, said tetrasubstituted aromatic compound being employed in an amount of from 0.001 to 2 mole equivalents per mole of said aromatic tetramine when calculated in terms of halogen atom present in said tetrasubstituted aromatic compound, at a temperature sufficiently high to maintain at least one of the reactants in a molten state at least during the initial stage of the reaction, thereby effecting the polycondensation reaction.

It has been found that when a mixture of the above aromatic tetramine (A) and the aromatic dinitrile (B) is heated to a temperature above 250° C., aromatic polybenzimidazoles of relatively high molecular weight can be obtained by polycondensation in bulk. However, if it is desired to produce polymers having very high molecular weights by this process, the reaction must be conducted at a relatively high temperature and over a relatively long period of time. As a result, insoluble and infusible polymers may often be formed by a side reaction such as a cross-linking reaction. Thus, this process still can have difficulties associated therewith.

According to this invention it is possible to increase the velocity of the bulk polycondensation reaction between the aromatic tetramine (A) and the aromatic dinitrile (B) without the difficulties mentioned above. This can be achieved through use of the above tetrasubstituted aromatic compound (C) as a third reaction component in the bulk polycondensation reaction of the present invention. Thus it becomes possible according to the process of the invention to employ a relatively low reaction temperature and a relatively short reaction period to obtain aromatic polybenzimidazoles having very high molecular weight without accompanying adverse side reactions. The tetrasubstituted aromatic compound (C) acts as a reaction promoter and is incorporated as a component of the resulting polymer chain.

In this invention it is considered advantageous to use compounds such as illustrated below as the aromatic tetramines (A), or the aromatic tetra-primary amines which contain two groups of amine substituents, said amine substituents in each group being in an ortho position relative to each other:

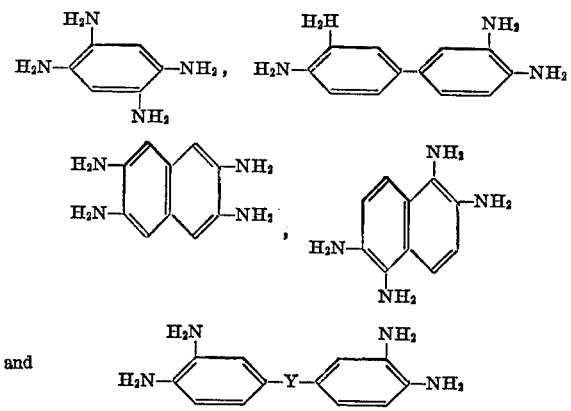

Where Y represents any non-reactive radical capable of linking two aromatic nuclei such as —(CR₁R₂)ₙ⁻ (wherein n is an integer of at least one, R₁ is hydrogen or lower alkyl and R₂ can be any of the groups defined by R₁), —O—, —S—,

—SO₂— and the like. Among such aromatic tetramines may be mentioned, for example, 1,2,4,5-tetraminobenzene,
1,2,5,6-tetramino naphthalene,
2,3,6,7-tetraminonaphthalene,
3,3'-diaminobenzidine,
3,4,3',4'-tetramino diphenyl ether,
3,4,3',4'-tetramino diphenyl methane,
3,4,3',4'-tetramino diphenyl ethane,
3,4,3',4'-tetramino diphenyl-2,2-propane,
3,4,3',4'-tetramino diphenylthioether, and
3,4,3',4'-tetramino diphenyl-sulfone.

These aromatic tetramines need not always be free amines but a portion of these amines can be inorganic acid salts, for example, tetramine-hydrochloride.

The aromatic dinitriles (B) employed in this invention are compounds containing two nitrile groups attached to an aromatic nucleus, and compounds of the following formulae are preferred:

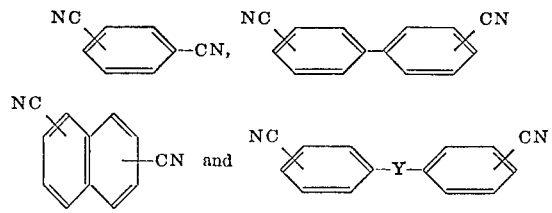

where Y is as previously defined. For example, the following compounds can be suitably employed: terephthalonitrile, isophthalonitrile, phthalonitrile, 4,4'-biphenyldinitrile, naphthalene-1, 4-dinitrile, naphthalene-1, 6-dinitrile, naphthalene-2, 6-dinitrile, diphenylether-4, 4'-dinitrile, diphenylmethane-4, 4'-dinitrile, diphenylsulfone-4, 4'-dinitrile, diphenylthioether-4, 4'-dinitrile.

The tetrasubstituted aromatic compound (C) employed in the present invention contains two groups of ortho disposed substituents, wherein one of the four substituents or one of each ortho disposed substituent is halogen and the remaining substituents are amino groups. As above mentioned, said tetrasubstituted aromatic compound functions both as a reaction promoter and a third reaction component in the present invention, and includes two types of compounds: (a) aromatic triamino-monohalo compounds wherein two of the amino groups are situated in an ortho position relative to each other and the remaining amino group is situated in an ortho position relative to the halogen atom on the aromatic nucleus; and, (b) aromatic diamino-dihalo compounds wherein each one of the amino groups is in an ortho position relative to each one of the halogen atoms on the aromatic nucleus. The halogen can be any one of the group of chlorine, bromine, fluorine and iodine, and is preferably chlorine.

In this invention it is considered advantageous to use compounds such as illustrated below as the aromatic triamino-monohalo compounds:

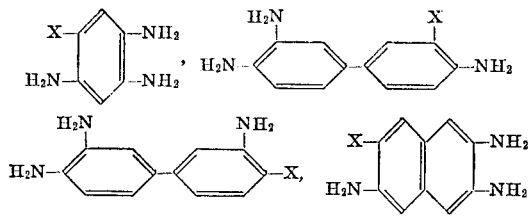

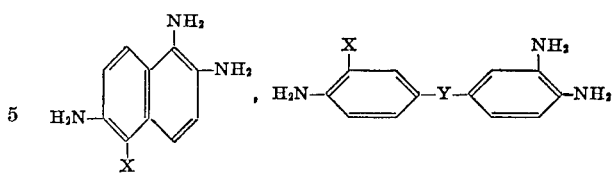

and

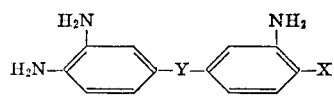

where X is a halogen atom and Y is as previously defined. For example, the compounds listed below can be suitably employed:

3-amino-3'-chloro-benzidine,
3-amino-3'-bromo-benzidine,
3-amino-3'-fluoro-benzidine,
3-amino-3'-iodo-benzidine,
3,4,4'-triamino-3'-chlorodiphenylether,
3,4,4'-triamino-3'-bromo-diphenylether,
1,2,4-triamino-5-chloro-benzene,
1,2,4-triamino-5-bromo-benzene,
1,3,4-triamino-6-chloro-benzene,
1,3,4-triamino-6-bromo-benzene,
2,3,6-triamino-7-chloro-naphthalene,
2,3,6-triamino-7-bromo-naphthalene,
3,4,4'-triamino-3'-chloro-diphenylmethane,
3,4,4'-triamino-3'-bromo-diphenylmethane,
3,4,4'-triamino-3'-chlorodiphenyl-sulfone,
3,4,4'-triamino-3'-bromo-diphenylsulfone, and
3,4,4'-triamino-3'-chloro-diphenylthioether.

As the aromatic diamino-dihalo compounds which can be employed in the present invention, compounds of the following formulae are preferred:

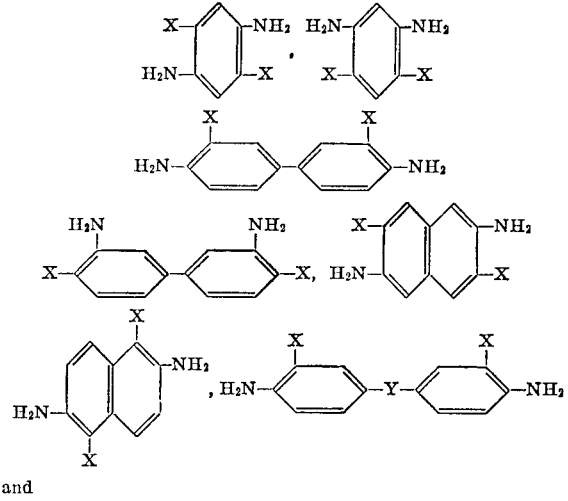

and

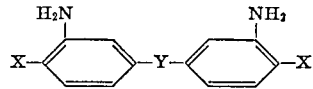

wherein X and Y are as previously defined. For example, the following compounds can be suitably employed:

3,3'-dichlorobenzidine,
3,3'-dibromo-benzidine,
3,3'-difluorobenzidine,
3,3'-diiodobenzidine,
4,4'-methylenebis (2-chloroaniline),
4,4'-methylene-bis (2-bromoaniline),
1,4-diamino-2,5-dichloro-benzene,
1,4-diamino-2,5-dibromo-benzene,
1,3-diamino-4,6-dichloro-benzene,
2,6-diamino-3,7-dichloro-naphthalene,
2,6-diamino-3,7-dibromo-naphthalene, 4,4'-diamino-3,3'-dichloro-diphenylether,
4,4'-diamino-3,3'-dichloro-diphenylsulfone,
4,4'-diamino-3,3'-dibromo-diphenylsulfone, and
4,4'-diamino-3,3'-dichloro-diphenylthioether.

As described above, the presence of a tetrasubstituted aromatic compound (C) in the reaction system promotes the polycondensation reaction of an aromatic tetramine (A) containing two groups of amine substituents, said amine substituents in each group being in an ortho position relative to each other and an aromatic dinitrile (B) in accordance with the present invention. The tetrasubstituted aromatic compound itself reacts with the aromatic dinitrile as the aromatic tetramine does. The reaction according to the present invention, for example, can be represented by the following equation which illustrates the reaction of 3,3'-diaminobenzidine, terephthalonitrile and 3-amino-3'-chloro-benzidine (or 3,3'-dichlorobenzidine) as a representative example of the polycondesation reaction of the present invention.

aromatic compound to be employed is calculated in terms of the amount of halogen atom contained therein. Therefore when the triamino-monohalo compound is employed as the tetrasubstituted aromatic compound, said compound is employed in an amount of from 0.001 to 2 moles per mole of the aromatic tetramine. Also, when the diaminodihalo compound is employed as the tetrasubstituted aromatic compound, the amount of said compound used ranges from 0.0005 to 1 mole per mole of the aromatic tetramine.

It is considered preferable in the present invention to employ the aromatic dinitrile in a ratio of about one mole per mole of the mixture consisting of the aromatic tetramine and the tetra-substituted aromatic compound. However, as distinguished from conventional polycondensation reactions, it is not considered necessary to maintain the amount of the aromatic dinitrile employed very close to one mole but instead, it can be varied within the range of from about 0.8 to about 1.2 moles per mole of the

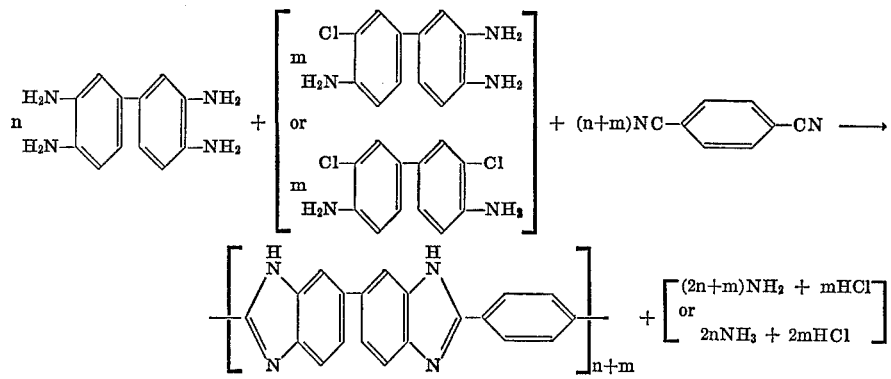

By-product hydrogen chloride produced in the above exemplary reaction can react with ammonia to form ammonium chloride or it can react with the benzimidazole ring in the polymer chain to form the hydrochloric acid salt of the polymer.

In the prior art process which comprises effecting a polycondensation reaction between an aromatic tetramine and a diphenyl ester of an aromatic dicarboxylic acid, it is necessary to employ high temperature and high vacuum or a stream of an inert gas in order to completely remove the released phenol or water from the reaction system. However, when an aromatic tetramine, a terasubstituted aromatic compound and an aromatic dinitrile are heated together in accordance with the present invention, as illustrated in the above equation, the reaction proceeds while releasing ammonia and hydrogen halide which are highly volatile and hence easy to remove from the reaction system. Moreover, when a portion of the released hydrogen halide reacts with the released ammonia or the benzimidazole ring of the resulting polymer to form a salt thereof, such a salt need not be removed from the reaction system but instead, said salt is preferred to be present in the reaction system because of its promoter action for the polycondensation reaction of this invention. Therefore, it is possible for the reaction to proceed very smoothly under simple reaction conditions without the use of high vacuum or an inert gas stream.

The promoter action of the tetrasubstituted aromatic compound is pronounced when said aromatic compound is used in an amount of from 0.001 to 2 mole equivalents calculated in terms of the halogen atom thereof, preferably from 0.002 to 1.5 mole equivalents per mole of the aromatic tetramine. The use of the tetrasubstituted aromatic compound in amounts in excess of about 2 mole equivalents per mole of the aromatic tetramine tends to result in the formation of insoluble and infusible polymers before sufficiently high molecular weight is reached.

As aforementioned, the amount of the tetrasubstituted mixture of the aromatic tetramine and the tetrasubstituted aromatic compound without any noticeable effect upon the reaction.

Thus, one of the features of the present invention is that the polycondensation reaction can be conducted in the absence of a solvent by heating a mixture of (A) an aromatic tetramine containing two groups of amine substituents, said amine substituents in each group being in an ortho position relative to each other, (B) an aromatic dinitrile and (C) a tetrasubstituted aromatic compound containing three amine substituents and one halogen atom, or two amine substituents and two halogen atoms on the aromatic nucleus, said substituents being positioned relative to each other as described hereinabove, and thereby obtaining high molecular weight aromatic polybenzimidazoles. Further, high vacuum need not be employed in the present invention.

The reaction in accordance with the present invention is normally conducted in a closed vessel under atmospheric pressure or elevated pressure, but the reaction can also be performed under reduced pressure, if desired. Reduction of pressure during the initial stage of the reaction should be limited to avoid substantial loss of the starting materials by sublimation or evaporation. Prior to the reaction according to the present invention, the aromatic tetramine, aromatic dinitrile and the tetrasubstituted aromatic compound as a promoter can be admixed in the form of a powder.

The polycondensation reaction according to the present invention can be conducted by heating the reaction mass at a temperature sufficiently high to melt the reaction mixture at least during the initial stage of the reaction. Advantageously, the reaction can be conducted at from about 200° to about 450° C., and preferably from about 250° to about 400° C. It is considered preferable to continue heating at a temperature within said range until the polycondensation reaction is completed. Generally, a reaction time of from about 1 to about 3 hours is sufficient. A reaction period shorter than one hour can give satisfactory results by selecting suitable conditions such as the amount of the tetrasubstituted aromatic compound and the reaction temperature. Reaction periods exceeding three hours can also be used. In this invention, as mentioned above, the reaction system need not be maintained in a molten condition until completion of the reaction. The reaction system can become solidified at a relatively early stage of the reaction, but the reaction can proceed satisfactorily in a solid state to produce polymers of high molecular weights by maintaining the reaction temperature as indicated above.

Since the presence of molecular oxygen tends to cause side reactions such as oxidation reactions, in this invention, it is considered desirable to conduct the reaction in an atmosphere of an inert gas such as nitrogen or argon.

A portion of the hydrogen halide which is generated during the reaction may sometimes be contained, in the form of a salt, in the resulting polybenzimidazole. However such hydrogen halide can be easily removed from the polymer by washing with alkali solution such as aqueous solution of ammonia.

Aromatic polybenzimidazoles produced by the process of the present invention are excellent in thermal stability, and can be employed for the production of various formed articles such as fibers, films and other materials having a wide field of application.

The present invention is further illustrated by the following examples. All percentages and parts are by weight unless otherwise indicated.

EXAMPLE 1

A mixture consisting of 8.15 gms. of 3,3'-diaminobenzidine (0.038 mole), 5.12 gms. of isophthalonitrile (0.04 mole) and 0.47 gm. of 3-amino-3'-chloro-benzidine (0.002 mole) was charged to a reaction vessel. After being purged with nitrogen, the vessel was sealed and the mixture was heated with the temperature being raised to 330° C. over a period of one hour. Although the inner pressure of the vessel was increased due to generation of ammonia gas, the heating was continued for 3 hours at 330° C. After completion of the reaction, the reaction mixture was allowed to cool to room temperature and the vessel was opened to recover the foamed resinous polymer.

The resulting polymer was washed with a dilute aqueous solution of ammonia and pure water and was then dried at 80° C. under a reduced pressure for 5 hours. The polymer yield was 12.25 gms. The polymer was soluble in sulfuric acid, formic acid, dimethyl sulfoxide and N-methylpyrrolidone. The reduced viscosity of the polymer as determined in concentrated sulfuric acid at a concentration of 0.5 gm./dl. at 30° C. was 0.93 dl./gm. The thermogravimetric analysis (TGA) indicated that the polymer would not show any weight-loss in air at a temperature below 540° C. Brownish, transparent and tough film was obtained from a N-methylpyrrolidone solution of the polymer. The infrared absorption spectrum of said film showed that the polymer had the polyphenylene benzimidazole structure.

COMPARATIVE EXAMPLE 1

A mixture consisting of 8.57 gms. of 3,3'-diaminobenzidine (0.04 mole) and 5.12 gms. of isophthalonitrile (0.04 mole) was charged to a reaction vessel and the reaction was effected under the same condition as in Example 1 except that 3-amino-3'-chloro-benzidine was not employed. The polymer obtained was a brittle solid. The reduced viscosity of the polymer measured in concentrated sulfuric acid at a concentration of 0.5 gm./dl. at 30° C. was 0.31 dl./gm.

It was necessary to continue the reaction for about 6 hours at 410° C. in order to obtain a polymer of extremely high molecular weight similar to that of Example 1 (having a reduced viscosity of 0.93 dl./gm. in concentrated sulfuric acid at a concentration of 0.5 gm./dl. at 30° C.) by using the mixture described above, and, in addition, about 20% of the polymer thus obtained was insoluble in sulfuric acid.

COMPARATIVE EXAMPLE 2

A mixture consisting of 2.14 gms. of 3,3'-diaminobenzidine (0.01 mole), 7.00 gms. of 3-amino-3'-chloro-benzidine (0.03 mole), said amount being 3 moles of the latter per mole of 3,3'-diaminobenzidine, and 5.12 gms. of isophthalonitrile (0.04 mole) was charged to a reaction vessel and the reaction was effected under the same condition as in Example 1. The polymer formed was a brittle solid and black in color. The polymer was insoluble in concentrated sulfuric acid and organic solvents.

The reactions were examined using the same starting mixture as above at 330° C. in different reaction periods of 20 minutes, 35 minutes and 1 hour. The reaction which was continued for 1 hour resulted in the production of insoluble polymer as described above. While by the reactions for 20 minutes and 35 minutes, polymers soluble in concentrated sulfuric acid were obtained, the reduced viscosity of these polymers were only 0.11 dl./gm. and 0.22 dl./gm. respectively when measured in concentrated sulfuric acid at a concentration of 0.5 gm./dl. at 30° C.

EXAMPLES 2–5

In the following examples, a mixture consisting of 7.93 gms. of 3,3'-diaminobenzidine, 5.12 gms. of isophthalonitrile and the respective aromatic triamino-monohalo compounds listed in Table 1 below was subjected to the same reaction conditions as in Example 1 and high molecular weight polybenzimidazoles were obtained almost quantitatively by the same procedure. The results are shown in Table 1.

TABLE 1

| Example | Aromatic triamino monohalo compound | Grams | Reduced viscosity (dl./gm.)* |
|---|---|---|---|
| 2 | 3-amino-3'-chloro-benzidine | 0.70 | 0.99 |
| 3 | 3-amino-3'-bromo benzidine | 0.84 | 0.80 |
| 4 | 1,2,4-triamino-5-chloro-benzene | 0.47 | 1.06 |
| 5 | 1,2,4-triamino-5-bromo-benzene | 0.62 | 0.93 |

* The values are measured in concentrated sulfuric acid at a concentration of 0.5 gm./dl. at 30° C.

EXAMPLE 6

A mixture consisting of 7.50 gms. of 3,3'-diaminobenzidine (0.035 mole), 5.12 gms. of terephthalonitrile (0.04 mole) and 1.18 gms. of 3 - amino - 3'-chloro-benzidine (0.005 mole) was charged to a reaction vessel. The vessel was purged with nitrogen and sealed under a reduced pressure of about 10 mm. Hg. The mixture was then heated at 320° C. for 2 hours. The resulting polymer was recovered from the vessel, washed with a dilute aqueous solution of ammonia and pure water, and then dried under reduced pressure. The polymer yield was 12.30 gms. The reduced viscosity of the polymer was 0.81 dl./gm. when measured in concentrated sulfuric acid at a concentration of 0.5 gm./dl. at 30° C. Infrared analysis indicated that the polymer had the polyphenylene benzimidazole structure. TGA indicated no weight loss in air at a temperature below 540° C., which means that the polymer has excellent thermal stability.

COMPARATIVE EXAMPLE 3

A mixture consisting of 2.14 gms. of 3,3'-diaminobenzidine, 5.12 gms. of terephthalonitrile and 7.01 gms. of 3-amino-3'-chloro-benzidine (3 moles per mole of 3,3'-diamino-benzidine) was charged to a reaction vessel and the reaction was conducted under the same conditions as in the Example 6. The resulting polymer was a black, brittle solid polymer, which was insoluble in concentrated sulfuric acid and organic solvents.

EXAMPLE 7

A mixture consisting of 10.70 gms. of 3,3'-diaminobenzidine, 12.22 gms. of 4,4'-diphenyldinitrile and 2.34 gms. of 3-amino-3'-chloro-benzidine was charged to a reaction vessel. After purging air with nitrogen, the reaction vessel was sealed under a reduced pressure of 5 mm. Hg and thereafter the mixture was heated at 295° C. for 2 hours. The vessel was then opened to release generated ammonia gas and thereafter heated further at a temperature of 310° C. for 1 more hour under a reduced pressure of 3 mm. Hg. The reduced viscosity of the resulting polybenzimidazole was 1.48 dl./gm. when measured in concentrated sulfuric acid at a concentration of 0.5 gm./dl. at 30° C.

EXAMPLE 8

A mixture consisting of 4.14 gms. of 1,2,4,5-tetraminobenzene, 6.42 gms. of isophthalonitrile and 3.15 gms. of 1,2,4-triamino-5-chloro-benzene was charged to a reaction vessel. After purging air with nitrogen, the vessel was sealed and then the mixture was heated to a temperature of 295° C. for 1.5 hours. The vessel was then opened to remove generated ammonia gas and heated again in the presence of a stream of nitrogen under atmospheric pressure at a temperature of 320° C. for 2 hours. The reduced viscosity of the resulting polybenzimidazole was 1.52 dl./gm. when measured in concentrated sulfuric acid at a concentration of 0.5 gm./dl. at 30° C.

EXAMPLES 9–13

Mixtures consisting of an aromatic tetramine, an aromatic dinitrile and an aromatic triamino-monohalo compound as summarized in Table 2 were charged to reaction vessels and the reactions conducted in the same manner as in Example 8. High molecular weight polybenzimidazoles were substantially quantitatively obtained. The results are summarized in Table 2.

centration of 0.5 gm./dl. at 30° C. was 0.84 dl./gm. and that measured in 99% formic acid at 30° C. at a concentration of 0.3 gm./dl. was 3.3 dl./gm. TGA indicated that it would not show any weight-loss in air below 540° C. Brownish, transparent and tough film was obtained from a dimethyl sulfoxide solution of the polymer. Infrared analysis of said film showed that the polymer had the polyphenylene benzimidazole structure.

COMPARATIVE EXAMPLE 4

A mixture consisting of 8.57 gms. of 3,3'-diaminobenzidine (0.04 mole) and 5.12 gms. isophthalonitrile (0.04 mole) was charged to a reaction vessel and the reaction was effected under the same conditions as in Example 14 except that 3,3'-dichlorobenzidine was not employed. The polymer obtained was a brittle solid. The reduced viscosity of the polymer measured in concentrated sulfuric acid at a concentration of 0.5 gm./dl. at 30° C. was 0.31 dl./gm. and that measured in 99% formic acid a concentration of 0.3 gm./dl. at 30° C. was 0.51 dl./gm.

It was necessary to continue the reaction for about 5 hours at 410° C. in order to obtain a polymer of extremely high molecular weight similar to that of Example 14 (having a reduced viscosity of 0.84 dl./gm. in concentrated sulfuric acid at a concentration of 0.5 gm./dl. at 30° C.) by using the mixture described above, and, in addition, about 15% of the polymer thus obtained was insoluble in sulfuric acid.

COMPARATIVE EXAMPLE 5

A mixture consisting of 4.07 gms. of 3,3'-diaminobenzidine (0.019 mole), 5.32 gms. of 3,3'-dichlorobenzidine (0.021 mole) (1.1 moles per mole of 3,3'-diaminobenzidine) and 5.12 gms. of isophthalonitrile (0.04 mole) was charged to a reaction vessel and the reaction

TABLE 2

| Example | Aromatic tetramine | Grams | Aromatic dinitrile | Grams | Reduced triamino monohalo compound | Grams | Reduced viscosity, dl./gm. |
|---|---|---|---|---|---|---|---|
| 9 | 3,4,3',4'-tetramino diphenylether | 9.22 | Diphenylether-4,4'-dinitrile | 11.01 | 3,4,4'-triamino-3'-chloro-diphenylether. | 2.50 | 1.30 |
| 10 | 3,4,3',4'-tetramino diphenylsulfone | 11.14 | Diphenylsulfone-4,4'-dinitrile | 13.41 | 3,4,4'-triamino-3'-bromo-diphenylsulfone. | 3.42 | 0.95 |
| 11 | 2,3,6,7-tetramino naphthalene | 7.53 | Naphthalene-2,6-dinitrile | 8.90 | 2,3,6-triamino-7-chloro-naphthalene. | 2.08 | 0.88 |
| 12 | 1,2,5,6-tetramino naphthalene | 7.53 | Naphthalene-1,6-dinitrile | 8.90 | 3-amino-3'-fluoro-benzidine. | 2.17 | 0.90 |
| 13 | 3,3'-diaminobenzidine | 8.57 | Diphenylmethane-4,4'-dinitrile. | 10.92 | 3,4,4'-triamino-3'-chloro-diphenylthioether. | 2.66 | 1.19 |

In Table 2, the values of reduced viscosity are values obtained in concentrated sulfuric acid at a concentration of 0.5 gm./dl. at 30° C.

EXAMPLE 14

A mixture consisting of 8.36 gms. of 3,3'-diaminobenzidine (0.039 mole), 5.12 gms. of isophthalonitrile (0.04 mole) and 0.25 gm. of 3,3'-dichlorobenzidine was charged to a reaction vessel. After being purged with nitrogen, the vessel was sealed and the mixture was heated with the temperature being raised to 330° C. over a period of 1 hour. Although the inner pressure of the vessel was increased due to the generation of ammonia gas, heating was continued for 3 hours at 330° C. After completion of the reaction, the reaction mixture was allowed to cool to room temperature and the vessel was opened to recover the foamed, resinous polymer.

The resulting polymer was washed with a dilute aqueous solution of ammonia and pure water and was thereafter dried at 100° C. under a reduced pressure for about 2 hours. The polymer yield was 12.21 gms. The polymer obtained was soluble in sulfuric acid, formic acid and dimethyl sulfoxide. The reduced viscosity of the polymer as determined in concentrated sulfuric acid at a conwas effected under the same conditions as in the Example 14. The polymer formed was black in color and a brittle solid, and was insoluble in concentrated sulfuric acid and organic solvents.

Reactions were conducted employing the same starting mixture as above at 330° C. for 30 minutes, 45 minutes and 1 hour, respectively. After 1 hour's reaction, insoluble polymer as described above was produced. In the reactions of 30 minutes and 45 minutes duration, the resulting polymers were soluble in concentrated sulfuric acid but the reduced viscosity thereof were only 0.09 dl./gm. and 0.19 dl./gm., respectively, when measured in concentrated sulfuric acid at a concentration of 0.5 gm./dl. at 30° C.

EXAMPLES 15–18

Mixtures consisting of 8.15 gms. of 3,3'-diaminobenzidine, 5.12 gms. of isophthalonitrile and the different aromatic diaminodihalo compounds listed in Table 3 below were subjected to the same reaction conditions as in the Example 14 and high molecular weight polymers were obtained substantially quantitatively by the same procedure. The results are shown in Table 3.

TABLE 3

| Example | Aromatic diamino dihalo compound | Grams | Reduced viscosity (dl./gm.)* |
|---|---|---|---|
| 15 | 3,3'-dichlorobenzidine | 0.51 | 1.04 |
| 16 | 3,3'-dibromobenzidine | 0.68 | 0.85 |
| 17 | 4,4'-methylene-bis (2-chloroaniline) | 0.53 | 1.25 |
| 18 | 4,4'-methylene-bis (2-bromoaniline) | 0.71 | 0.97 |

*The values are measured in concentrated sulfuric acid at a concentration of 0.5 gm./dl. at 30° C.

EXAMPLE 19

A mixture consisting of 7.93 gms. of 3,3'-diaminobenzidine (0.037 mole), 5.12 gms. of terephthalonitrile (0.04 mole) and 0.76 gm. of 3,3'-dichlorobenzidine (0.003 mole) was charged to a reaction vessel. The vessel was purged with nitrogen and then sealed under a reduced pressure of about 10 mm. Hg. The mixture was then heated at 320° C. for 2 hours. The resulting polymer was recovered from the vessel, washed with a dilute aqueous solution of ammonia and pure water, and then dried under a reduced pressure. The polymer yield was 12.25 gms. The reduced viscosity of the polymer was 0.74 dl./gm. when measured in concentrated sulfuric acid at a concentration of 0.5 gm./dl. at 30° C., and 2.2 dl./gm. when measured in 99% formic acid at a concentration of 0.3 gm./dl. at 30° C. Infrared analysis indicated that the polymer had the polyphenylene benzimidazole structure. TGA showed no weight loss in air at a temperature below 540° C., which means that the polymer has excellent thermal stability.

COMPARATIVE EXAMPLE 6

A mixture consisting of 8.57 gms. of 3,3'-diaminobenzidine (0.04 mole) and 5.12 gms. of terephthalonitrile (0.04 mole) was charged to a reaction vessel and the reaction was effected under the same conditions as in the Example 19 except that 3,3'-dichlorobenzidine was not employed. The resulting polymer was a brittle solid. The reduced viscosity of the polymer measured in concentrated sulfuric acid at a concentration of 0.5 gm./dl. at 30° C. was 0.22 dl./gm. and that measured in 99% formic acid at a concentration of 0.3 gm./dl. at 30° C. was 0.32 dl./gm.

In order to obtain a polymer having as high molecular weight as that of the Example 19 (having a reduced viscosity of 0.74 dl./gm. in concentrated sulfuric acid at a concentration of 0.5 gm./dl. at 30° C.) by using the mixture described above, it was necessary to continue the reaction at 400° C. for about 5 hours, and, in addition, about 30% of the polymer thus obtained was insoluble in sulfuric acid.

COMPARATIVE EXAMPLE 7

A mixture consisting of 4.07 gms. of 3,3'-diaminobenzidine (0.019 mole), 5.32 gms. of 3,3'-dichlorobenzidine (0.021 mole), the amount being 1.1 mole of the latter per mole of 3,3'-diaminobenzidine, and 5.12 gms. of terephthalonitrile was charged to a reaction vessel and the reaction was effected under the same conditions as in the Example 19. The resulting polymer was a brittle solid and black in color. The polymer was insoluble in concentrated sulfuric acid and organic solvents.

EXAMPLE 20

A mixture consisting of 6.86 gms. of 3,3'-diaminobenzidine, 8.17 gms. of 4,4'-diphenyldinitrile and 2.02 gms. of 3,3'-dichlorobenzidine was charged to a reaction vessel. After purging air with nitrogen, the vessel was sealed under a reduced pressure of 4 mm. Hg and thereafter the mixture was heated at 300° C. for 2 hours. The vessel was then opened to release generated ammonia gas and thereafter heated further for an additional hour at 305° C. under a reduced pressure of 4 mm. Hg. The reduced viscosity of the resulting polybenzimidazole was 1.31 dl./gm. when measured in concentrated sulfuric acid at a concentration of 0.5 gm./dl. at 30° C.

EXAMPLE 21

A mixture consisting of 6.22 gms. of 1,2,4,5-tetraminobenzene, 6.42 gms. of isophthalonitrile and 0.89 gm. of 1,4-diamino-2,5-dichlorobenzene was charged to a reaction vessel. After being purged with nitrogen, the vessel was sealed and then the mixture was heated at 300° C. for 2 hours. The vessel was then opened to release generated ammonia gas and heated again in the presence of a stream of nitrogen under atmospheric pressure at 325° C. for 1 hour. The reduced viscosity of the resulting polybenzimidazole was 1.36 dl./gm. when measured in concentrated sulfuric acid at a concentration of 0.5 gm./dl. at 30° C.

EXAMPLES 22–26

Aromatic tetramines, aromatic dinitriles and aromatic diamino-dihalo compounds summarized in Table 4 were employed to effect polycondensation reactions in the same manner as Example 21, resulting in the production of high molecular weight polybenzimidazoles on a quantitative basis. The results obtained are summarized in Table 4. In Table 4, the reduced viscosity is the value obtained in concentrated sulfuric acid at a concentration of 0.5 gm./dl. at 30° C.

TABLE 4

| Example | Aromatic tetramine | Grams | Aromatic dinitrile | Grams | Aromatic diamino-dihalo compound | Grams | Reduced viscosity, dl./gm. |
|---|---|---|---|---|---|---|---|
| 22 | 3,4,3',4'-tetramino diphenylether | 10.36 | Diphenylether-4,4'-dinitrile | 11.01 | 4,4'-diamino-3,3'-dichloro-diphenyl-ether. | 1.35 | 1.45 |
| 23 | 3,4,3',4'-tetramino diphenylsulfone | 12.52 | Diphenylsulfone-4,4'-dinitrile | 13.41 | 4,4'-diamino-3,3'-dibromo-diphenylsulfone. | 2.03 | 0.91 |
| 24 | 2,3,6,7-tetramino naphthalene | 8.47 | Naphthalene-2,6-dinitrile | 8.90 | 2,6-diamino-3,7-dichloro-naphthalene. | 1.26 | 0.89 |
| 25 | 1,2,5,6-tetramino naphthalene | 8.47 | Naphthalene-1,6-dinitrile | 8.90 | 3,3'-difluorobenzidine | 1.10 | 0.85 |
| 26 | 3,3'-diaminobenzidine | 9.64 | Diphenylmethane-4,4' dinitrile | 10.92 | 4,4'-diamino-3,3'-dichloro-diphenylthio-ether. | 1.43 | 1.31 |

What is claimed is:

1. A process for preparation of aromatic polybenzimidazoles which comprises heating a mixture of (A) an aromatic tetramine containing two groups of amine substituents, said amine substituents in each group being in an ortho position relative to each other on the aromatic nucleus; (B) an aromatic dinitrile, and (C) a tetrasubstituted aromatic compound containing two groups of ortho disposed substituents, wherein one of the four substituents or one substituent in each group is halogen and the remaining substituents are amino groups, said component (C) being present in an effective promoting amount, at a temperature sufficient to effect the polycondensation reaction.

2. A process according to claim 1 wherein said tetrasubstituted aromatic compound is employed in an amount of from 0.001 to 2 mole equivalents per mole of said aromatic tetramine when calculated in terms of halogen atom present in said tetra-substituted aromatic compound.

3. A process according to claim 1 wherein said tetrasubstituted aromatic compound is an aromatic triamino-monohalo compound wherein two of the amino groups are in an ortho position relative to each other and the remaining amino group is in an ortho position to the halogen atom on the aromatic nucleus.

4. A process according to claim 1 wherein said tetrasubstituted aromatic compound is an aromatic diaminodihalo compound wherein each amino group is in an ortho position with respect to a halogen atom on the aromatic nucleus.

5. A process according to claim 1 wherein said tetrasubstituted aromatic compound is employed in an amount of from 0.002 to 1.5 mole equivalents per mole of said aromatic tetramine when calculated in terms of halogen atoms present in said tetrasubstituted aromatic compound.

6. A process according to claim 1 wherein the aromatic dinitrile is employed in an amount of from about 0.8 to about 1.2 moles per mole of the mixture of the aromatic tetramine and the tetrasubstituted aromatic compound.

7. A process according to claim 1 wherein the aromatic dinitrile is employed in an amount of about one mole per mole of the mixture of the aromatic tetramine and the tetrasubstituted aromatic compound.

8. A process according to claim 1 wherein the reaction is conducted at a temperature ranging from about 200° C. to about 450° C.

9. A process according to claim 1 wherein the reaction is conducted in an inert atmosphere.

10. A process for preparation of aromatic polybenzimidazoles which comprises heating a mixture of (A) an aromatic tetramine containing two groups of amine substituents, said amine substituents in each group being in an ortho position relative to each other on the aromatic nucleus; (B) an aromatic dinitrile and (C) an aromatic triamino-monohalo compound wherein two of the amino groups are in an ortho position relative to each other and the remaining amino group is in an ortho position to the halogen atom on the aromatic nucleus, said compound (C) being employed in an amount of from 0.001 to 2 moles per mole of said aromatic tetramine (A), and said aromatic dinitrile (B) being employed in an amount ranging from about 0.8 to about 1.2 moles per mole of the mixture of (A) and (C), at a temperature ranging from about 250° C. to about 400° C., thereby effecting the polycondensation reaction.

11. A process for preparation of aromatic polybenzimidazoles which comprises heating a mixture of (A) an aromatic tetramine containing two groups of amine substituents, said amine substituents in each group being in an ortho position relative to each other on the aromatic nucleus; (B) an aromatic dinitrile, and (C) an aromatic diamino-dihalo compound wherein each amino group is in an ortho position with respect to a halogen atom on the aromatic nucleus, said compound (C) being employed in an amount of from 0.0005 to 1 mole per mole of said aromatic tetramine (A), and said aromatic dinitrile (B) being employed in an amount ranging from about 0.8 to 1.2 moles per mole of the mixture of (A) and (C), at a temperature ranging from about 250° C. to about 400° C., thereby effecting the polycondensation reaction.

12. A process according to claim 10 wherein the aromatic tetramine is 3,3'-diaminobenzidine, the aromatic dinitrile is isophthalonitrile, and the triamino-monohalo compound is 3-amino-3'-chloro-benzidine.

13. A process according to claim 11 wherein the aromatic tetramine is 3,3'-diaminobenzidine, the aromatic dinitrile is isophthalonitrile and the aromatic diamino-dihalo compound is 3,3'-dichlorobenzidine.

References Cited
UNITED STATES PATENTS

| | | | |
|---|---|---|---|
| 3,313,783 | 4/1967 | Iwakura | 260—78 |
| 3,509,108 | 4/1970 | Prince | 260—78.4 |

JOSEPH L. SCHOFER, Primary Examiner

J. KIGHT, Assistant Examiner

U.S. Cl. X.R.

260—47 R, 78 R

UNITED STATES PATENT OFFICE
CERTIFICATE OF CORRECTION

Patent No. 3,686,149    Dated August 22, 1972

Inventor(s) Yoshio Ohfuji

It is certified that error appears in the above-identified patent and that said Letters Patent are hereby corrected as shown below:

Column 5, line 49, "terasubstituted" should be --tetrasubstituted--.

Columns 9 and 10, Table 2, delete "Reduced" from the title of the sixth column.

Signed and sealed this 18th day of December 1973.

(SEAL)
Attest:

EDWARD M. FLETCHER, JR.
Attesting Officer

RENE D. TEGTMEYER
Acting Commissioner of Patents